Feb. 12, 1924.

H. P. KRAFT

PIPE COUPLING

Filed May 10, 1920

1,483,454

INVENTOR:

Henry P. Kraft

By Attorneys,

Fraser, Furst & Myers

Patented Feb. 12, 1924.

1,483,454

UNITED STATES PATENT OFFICE.

HENRY P. KRAFT, OF RIDGEWOOD, NEW JERSEY.

PIPE COUPLING.

Application filed May 10, 1920. Serial No. 380,025.

*To all whom it may concern:*

Be it known that I, HENRY P. KRAFT, a citizen of the United States of America, residing in Ridgewood, in the county of Bergen and State of New Jersey, have invented certain new and useful Improvements in Pipe Couplings, of which the following is a specification.

This invention relates to pipe couplings and aims to provide certain improvements therein.

In certain types of vulcanizing apparatus for tire casings, means are provided for coupling short lengths of pipe to produce a continuous pipe for carrying the steam under pressure. It is very desirable in such apparatus to provide a coupling device which will be very easily operated to couple and uncouple such pipes and which will provide a steam tight joint when in the coupled position. As the space is restricted it is also desirable that the coupling device shall be as compact as possible. The object of the present invention is to provide such a coupling device and one, which, in addition, will be cheap to manufacture and convenient and efficient in use.

In the drawing wherein I have illustrated a coupling which embodies the preferred form of the present invention:—

Figure 1:
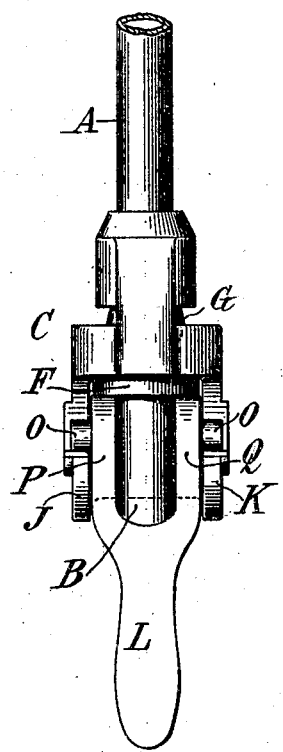
Figure 1 is an elevation.

Referring to the drawings, let A indicate one length of pipe which it is desired to couple to another length B. The pipe A is clearly shown in Figs. 1, 2 and 3, and the pipe B is also shown in these figures, but more clearly in Fig. 4 wherein it is illustrated as detached. These pipes are suitably connected with a steam line and molds in a manner which need not be described.

Figure 2:
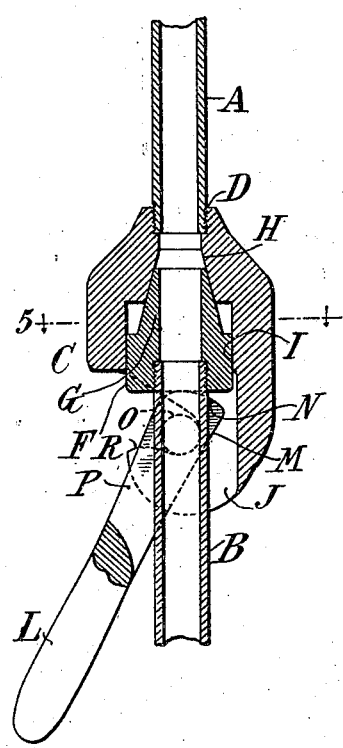
Fig. 2 is a vertical section partly in elevation taken at right angles to Fig. 1.

To the pipe A is connected the main coupling device C as by screwing the coupling device on the end of the pipe as is best illustrated at D in Fig. 2. The pipe B is provided with a head E which comprises generally, a collar F and a tapered seating face G. This tapered seating face is adapted to enter a tapered recess or seat H on the interior of the coupling C. Preferably, the coupling C is provided with a cylindrical recess I within which the collar F of the pipe B fits snugly, thus guiding the tapered face G into the seat H as best seen in Fig. 2.

Figure 3:
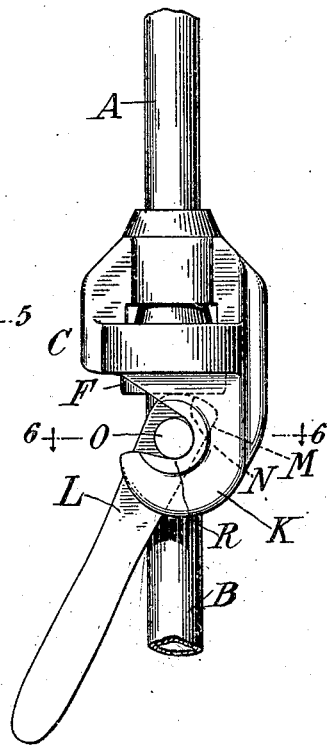
Fig. 3 is an elevation of Fig. 2.
Figure 4:
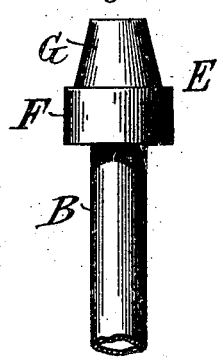
Fig. 4 is an elevation of one of the lengths of pipe.
Figure 5:
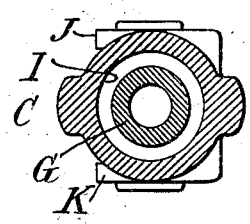
Fig. 5 is a cross section on the line 5—5 in Fig. 2.
Figure 6:
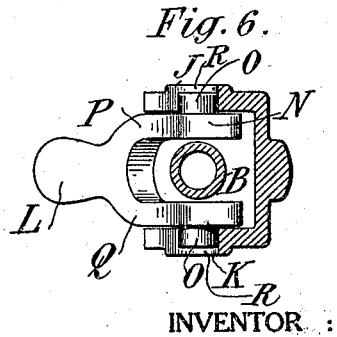
Fig. 6 is a cross section on the line 6—6 in Fig. 3.

Means are provided for forcing the tapered seating face G into its seat under considerable pressure. To accomplish this according to the present invention, I provide the coupling C with two arms J and K respectively, which are separated to permit the pipe B to pass between them. These arms comprise re-action members which are designed to receive the thrust of a lever or cam device L, the short end M of which bears against the collar F and forces the latter upwardly to couple the parts together. The short end M of the lever L is preferably made with a cam surface N whereby a still greater application of force may be made against the collar F. The fulcrum of the lever L is preferably a pin O which engages the arms J and K as best seen in Fig. 3.

Preferably the lever L is slotted to form two arms P and Q as best seen in Fig. 1, the arms straddling the pipe B as shown. In this case the pivoted pin O will be formed in two parts so as to avoid interference with the pipe as best seen in Fig. 1.

In order to facilitate the introduction of the pipe B into the coupling, I prefer to make the lever L removable from the coupling and for this purpose J and K are best formed as hooks, open on one side and provided with bearing faces R on which the pivots O are designed to rest and turn. By this construction the lever L may be completely removed, thus leaving the coupling freely open to receive the pipe B and permitting ease of insertion of the head E in place within the coupling. When this has been accomplished, the lever L is then positioned in place and swung downwardly, thereby forcing the pipe B upwardly into leak tight connection with the pipe A.

The invention provides a very simple and convenient coupling device which is especially applicable for vulcanizing presses of the type referred to and by means of which the coupling operations may be very quickly and conveniently performed without loss of time and with a certainty of leak tight connections being secured.

While I have shown and described one form of the invention, it will be understood that I do not wish to be limited thereto, since various changes may be made therein without departing from the spirit of the invention.

What I claim is:—

1. A coupling of the type described comprising a seat, a part adapted to contact with said seat, a pipe connected to said part, arms separated to permit the passage of such pipe and part longitudinally between the same, and a lever pivoted to said arms and adapted to act directly against said part to force it to said seat.

2. A coupling of the type described comprising a seat, a part adapted to contact with said seat, a pipe connected to said part, arms separated to permit the passage of such pipe and part longitudinally between the same, and a lever pivoted to said arms and adapted to act directly against said part to force it to said seat, and said lever having a cam face engageable with said part.

3. A coupling of the type described having a tapered seat, a pipe having a tapered head adapted to enter said seat, said seat and head being substantially unalterable in form, a pair of arms between which said pipe and head longitudinally passes, and a cam adapted to engage said head to force the same into said seat, and a lever connected to said cam.

4. A coupling of the type described having a substantially non-deformable seat, a pipe having a substantially non-deformable part to contact with said seat, a pair of arms separated to permit the passage of said pipe longitudinally between the same, and a removable lever adapted to pivot on said arms to force said seating parts together.

5. A coupling of the type described having a substantially non-deformable tapered seat, a pipe having a substantially non-deformable tapered head, a pair of hook shaped arms separated to permit the passage of the pipe longitudinally between them, and a two-armed lever straddling said pipe and having a pair of pivots adapted to removably engage said hook shaped arms, said lever operating against said head to force said seating faces together.

6. A coupling of the type described having a tapered seat, a pipe having a tapered head, a pair of hook shaped arms separated to permit the passage of the pipe between them, and a removable two-armed lever straddling said pipe and having a pair of pivots adapted to engage said hook shaped arms, said lever operating against said head to force said seating faces together, and said lever having cam faces spaced from the pivots adapted to engage said head.

7. A coupling of the type described having a tapered seat and a cylindrical recess normally in advance of said seat, a pipe having a head comprising a tapered portion adapted to enter said seat, a cylindrical collar adapted to enter said recess, a seat coupling having a pair of hook shaped arms separated to permit the passage of said pipe, and a cam lever having a pair of arms separated to embrace said pipe, pivots on said arms adapted to engage said hook shaped arms, and cam faces on said pivoted arms adapted to engage said collar to force the head against the tapered seat.

In witness whereof, I have hereunto signed my name.

HENRY P. KRAFT.